US007540021B2

(12) United States Patent
Page

(10) Patent No.: US 7,540,021 B2
(45) Date of Patent: May 26, 2009

(54) SYSTEM AND METHODS FOR AN IDENTITY THEFT PROTECTION BOT

(76) Inventor: Justin Page, 6 Sawyer St., Portland, ME (US) 04103

( * ) Notice: Subject to any disclaimer, the term of this patent is extended or adjusted under 35 U.S.C. 154(b) by 283 days.

(21) Appl. No.: 11/532,039

(22) Filed: Sep. 14, 2006

(65) Prior Publication Data

US 2007/0124270 A1 May 31, 2007

Related U.S. Application Data

(63) Continuation-in-part of application No. 09/557,252, filed on Apr. 24, 2000.

(51) Int. Cl.
*H04L 9/32* (2006.01)

(52) U.S. Cl. .............................. 726/6; 713/188; 707/5; 707/6; 709/224; 706/61; 726/7

(58) Field of Classification Search ................. 713/188; 707/1, 2, 3, 4, 5, 6; 726/6, 7; 709/224; 706/61
See application file for complete search history.

(56) References Cited

U.S. PATENT DOCUMENTS

| | | | |
|---|---|---|---|
| 5,274,547 | A | 12/1993 | Zoffel et al. |
| 5,323,315 | A | 6/1994 | Highbloom |
| 5,696,965 | A | 12/1997 | Dedrick |
| 5,742,775 | A | 4/1998 | King |
| 5,752,242 | A | 5/1998 | Havens |
| 5,809,478 | A | 9/1998 | Greco et al. |
| 5,818,030 | A | 10/1998 | Reyes |
| 5,872,921 | A | 2/1999 | Zahariev et al. |
| 5,878,403 | A | 3/1999 | DeFrancesco et al. |
| 5,943,666 | A | 8/1999 | Kleewein et al. |
| 5,999,907 | A | 12/1999 | Donner |

(Continued)

FOREIGN PATENT DOCUMENTS

| | | |
|---|---|---|
| EP | 1519281 | 3/2005 |

(Continued)

OTHER PUBLICATIONS

Notification of Transmittal of the International Search Report and the Written Opinion of the International Searching Authority, Jul. 21, 2008, 11 pp.

(Continued)

*Primary Examiner*—Matthew B Smithers
*Assistant Examiner*—Paul Callahan
(74) *Attorney, Agent, or Firm*—Verrill Dana, LLP; Chris A. Caseiro

(57) ABSTRACT

The present invention relates to an information security bot system for the mitigation of damage upon its victims, or enforcement of Identity Theft laws, by searching and inducing transactions with perpetrators of identity crimes (e.g. identity theft.). Searching is accomplished using a software spider search robot ("bot") that turns any transmitted personal information in to a bit-keyed array that cannot betray any of the known information of the users. Transactions with perpetrators are induced and affected using machine generated natural language techniques. In instances of success, data (actual, bogus or "poisoned") is transferred to or received from said perpetrators. This data can be used to protect victims or to ensnare perpetrators. In addition, the invention relates to offensive and proactive prevention of identity theft and other related crimes.

16 Claims, 2 Drawing Sheets

U.S. PATENT DOCUMENTS

| | | | | |
|---|---|---|---|---|
| 5,999,940 | A | 12/1999 | Ranger | |
| 6,023,694 | A | 2/2000 | Kouchi et al. | |
| 6,029,149 | A | 2/2000 | Dykstra et al. | |
| 6,029,194 | A | 2/2000 | Tilt | |
| 6,253,203 | B1 | 6/2001 | O'Flaherty et al. | |
| 6,317,783 | B1 | 11/2001 | Freishtat et al. | |
| 6,728,397 | B2 | 4/2004 | McNeal | |
| 6,871,287 | B1 | 3/2005 | Ellingson | |
| 6,918,038 | B1 | 7/2005 | Smith et al. | |
| 7,089,592 | B2 | 8/2006 | Adjaoute | |
| 2002/0010684 | A1 | 1/2002 | Moskowitz | |
| 2003/0056103 | A1 | 3/2003 | Levy et al. | |
| 2003/0120653 | A1 | 6/2003 | Brady et al. | |
| 2004/0107363 | A1 | 6/2004 | Monteverde | |
| 2004/0234117 | A1 | 11/2004 | Tibor | |
| 2005/0050577 | A1 | 3/2005 | Westbrook et al. | |
| 2005/0187863 | A1 | 8/2005 | Whinery et al. | |
| 2005/0257261 | A1 | 11/2005 | Shraim et al. | |
| 2006/0047725 | A1 | 3/2006 | Bramson | |
| 2006/0064374 | A1 | 3/2006 | Helsper | |
| 2006/0069697 | A1 | 3/2006 | Shraim et al. | |
| 2006/0075028 | A1 | 4/2006 | Zager et al. | |
| 2006/0080230 | A1 * | 4/2006 | Freiberg | 705/39 |
| 2006/0089905 | A1 * | 4/2006 | Song et al. | 705/39 |
| 2006/0149674 | A1 | 7/2006 | Cook et al. | |
| 2006/0168202 | A1 | 7/2006 | Reshef et al. | |
| 2006/0178971 | A1 * | 8/2006 | Owen et al. | 705/35 |
| 2006/0178982 | A1 | 8/2006 | Ramsey et al. | |
| 2008/0103800 | A1 * | 5/2008 | Domenikos et al. | 705/1 |

FOREIGN PATENT DOCUMENTS

| | | |
|---|---|---|
| JP | 10-257177 | 9/1998 |
| WO | WO97/14108 | 4/1997 |
| WO | WO01/04799 | 1/2001 |
| WO | WO03/010688 | 2/2003 |
| WO | WO2005/076135 | 8/2005 |
| WO | WO2006/017937 | 2/2006 |
| WO | WO2006/058217 | 6/2006 |
| WO | WO2006/065882 | 6/2006 |

OTHER PUBLICATIONS

Wang, Wenjie et al., A Contextual Framework for Combating Identity Theft, IEEE Security & Privacy, Mar./Apr. 2006, 1540-7993/06, 30-38, IEEE Computer Society, US.

Goth, Greg, Identity Theft Solutions Disagree on Problem, IEEE Distributed Systems Online, Aug. 2005, 1-4, vol. 6, No. 8, IEEE Computer Society, US.

McCarty, Bill, Automated Identity Theft, IEEE Security & Privacy, Sep./Oct. 2003, 89-92, 1540-7993/03, IEEE Computer Society, US.

Holz, Thorsten, A Short Visit to the Bot Zoo, IEEE Security & Privacy, May/Jun. 2005, 76-79, 1540-7993/05, IEEE Computer Society, US.

Lenton, Dominic, Stand And Deliver, IEE Review, May 2005, 24-25, iee.org, US.

Bose, Ranjit, Intelligent Technologies for Managing Fraud and Identity Theft, Proceedings 3rd Inter Conf Information Technology: New Generations, 2006, 6 pp, IEEE Computer Soc.

Gertler, Eric, PryingEyes (Introduction and Your Computer and the Internet sections), 2004, XI-XV and 169-216, Random House, US.

* cited by examiner

SYSTEM AND METHODS FOR AN IDENTITY THEFT PROTECTION BOT

CROSS-REFERENCE TO RELATED APPLICATION

This patent application is a continuation-in-part and claims the priority benefit of U.S. patent application Ser. No. 09/557,252, "System and Methods and Computer Program for the Prevention, Detection, And Reversal of Identity Theft" (the '252 application) filed Apr. 24, 2000, by the same named applicant. The contents of the '252 application are incorporated herein by reference.

BACKGROUND OF THE INVENTION

1. Field of the Invention

The present invention relates to identity theft detection and/or prevention systems. Specifically, a bot which locates identity thieves and engages them in a natural language trade of information.

2. Description of the Prior Art

Identity theft is the fastest growing crime in the U.S. with 1 in 5 Americans victimized. The average person spends $5,000 and 200 hours attempting to repair each identity theft incident. More serious identity theft can mean years of ruined credit, enormous losses of property, and even arrest for crimes committed by an identity thief.

More seriously, identity crimes now have profound national security implications. Because technology and specifically the internet, continues to grow exponentially, current law enforcement and investigation techniques are simply ineffective and completely reactive. Identity theft has been used to steal private information about huge databases of related and unrelated individuals. Terrorist identity theft is now emerging, where perpetrators use identity theft to fund terrorist activities. It has been reported that identity crimes are contemplated terrorist activities in order to interrupt financial infrastructures and to use stolen data to socially engineer fraud, complicity or assistance of terrorism by associating found data with specific groups, and performing terrorist acts against a particular group (e.g. an entire corporation's or government entity's employee base.)

SUMMARY OF THE INVENTION

The invention disclosed relates to an information security system for the mitigation of damage of Identity Theft upon its victims by searching and inducing transactions with perpetrators of identity crimes (e.g. identity theft.). Searching, identification and interaction are accomplished using a series of three primary knowledge domain software spider search robots ("bot" or "bots") or programming modules Transactions with perpetrators are induced and affected using machine generated natural language and domain based conversational techniques. In instances of success, data is transferred or received from said perpetrators. In an exemplary embodiment, notification would then optionally be made through an identity protection system. In an alternative embodiment it can be used as a tool for immediate and direct notification, with any evidence collected, to a law enforcement agency in as automated a means as the law enforcement agency allows/is capable of. In addition, the system and related method relate to offensive and proactive prevention of Identity Theft and other related crimes. The system and related method are further composed of means and steps for transmitting text strings into keyed arrays so that the system does not inadvertently betray any known personal information of its users. The first bot or module seeks out the locations of networks of computers or computer-based devices where nefarious activity may take place, particularly in the form of personal information acquisition and/or unauthorized usage thereof. The second bot or module identifies the source or sources of such networks, computers, or computing devices in a manner that minimizes the possibility of search detection or requestor information. The third bot or module interacts with the located source in a manner that is designed to draw out detailed information regarding the source, to deflect the source to an authorized agency, to deny the ability to obtain personal information, or any combination thereof.

The first bot or module includes programming designed to find locations on networks (e.g. the Internet in the form of Internet Relay Chat ("IRC") channels and of web sites where illegal personal identity information is collected, transmitted or remains (e.g. sites directed from "phishing" e-mails), and online chat rooms where transactions for the purchase and sale of illegally obtained or used private identity information. This information includes, but is not limited to, personal information such as name and address and a federal tax identification number (such as the Social Security Number in the U.S., or national identification numbers elsewhere,) location information, previous criminal or civil litigation information, incarceration information, property ownership records, employment information, medical records or insurance information, credit information including credit card numbers, expiration dates and/or CVV (and/or its successors) credit card security codes. This module further records new venues, terminology and text parsing techniques to overcome new communication types and increasing sophistication of criminals updating databases which are accessible and updatable by all three modules.

The second bot solicits and transacts through natural language interaction with one or a plurality of identity criminals. Locations are identified by the first module, as a location where identity information is for sale or trade. This natural language is of an "artificial intelligence" nature which is domain specific and dynamically updates its own database with found facts and terminology which relate to the commission of on-line or computer network-based crimes. These types of data maintained include but are not limited to, words, criminal terms of art, synonyms, and sentences. The invention attempts to commence conversations premised on a criminal transaction of identity data. The system also records the text of the conversation for future analyses and incorporation into the databases. All user input must be parsed to remove characters used to obscure the handle or name of the possible data thief as well as for linguistic analysis. The program removes all punctuation from inputs and checks for duplicate inputs. In order to create a conversation that is realistic to the human identity thief, some synonyms are derived from the synonym table. Pronouns must also be altered to create realistic conversation. A keywords database is then used to determine what kind of transaction type is expected, and certain types of explicit means for explicit circumstances. When a keyword is found, the user input preceding the keyword is extracted; transformations are performed on the extracted output and transferred in to a response. When the invention cannot derive an appropriate response, a non-committal or diffusive response is returned. The response is then transmitted via the network means applicable, and the conversation continues until a transaction, such as the sale or trade of bogus personal information or credit card numbers. When the invention transmits data in train, it is bogus data, such as the "test cases" used by credit bureaus for use by developers integration with their systems. The second bot then transfers information to any or all of the following: a financial notification system, pre-determined representatives of the user, credit bureaus and appropriate law enforcement agencies, or any other party as defined by the user, or to no other entity at all. All data is updated and derived from the same data sets as the other two modules.

The third bot is an automated means for informing or requesting the assistance of law enforcement using networks (e.g. the Internet) whether directly, (e.g. via a common system such as this inventor's prior privacy protection system (the '252 application.) or a common system such as "E-911" currently gaining acceptance in the United States. All data are updated and derived from the same data sets as the other two bots. This is specific to any given law enforcement agency's level of automation. In an exemplary embodiment, in instances where law enforcement agencies have means for automated report and response, but through old style internet forms, filters are written for the purpose of submitting automated responses, as if the complainant were typing the data themselves, into that particular law enforcement's system, by "screen scraping" and automated keystrokes. The fact that a law enforcement agency has no current internet connectivity and required manual intervention would also be discovered.

In an alternative embodiment of the functionality of the third bot of the system and related method, the data offered to an identity criminal will be "poisoned" (containing data which is "marked" or especially created for later detection and apprehension of the identity criminal) to allow for, among other things, "sting" operations by law enforcement.

The system and related methods herein disclosed draw from an extremely broad array of field of arts and possesses the novelty of a highly specialized utilization of these fields in the narrow field of art of prevention, detection and recovery from identity crimes. One module finds locations on networks (e.g. the Internet in the form of constantly changing sub-locations) IRC(Internet Relay Chat) channels and of web sites where illegal personal identity information is commonly collected, transmitted or remains (e.g. sites directed from "phishing" e-mails), and online chat rooms where transactions for the purchase and sale of illegally obtained or used private identity information. This information includes, but is not limited to, personal information such as name and address and a federal tax identification number (such as the Social Security Number in the U.S., or national identification numbers elsewhere,) location information, previous criminal or civil litigation information, incarceration information, property ownership records, employment information, medical records or insurance information, credit information including credit card numbers, expiration dates and/or CVV (and/or its predecessors) credit card security codes. The system embodied in one or more of the bots, all three of which form a singular interactive computer program arranged to control the operation of one or more computing devices, is further configured to record new venues, terminology and text parsing techniques detected and learned to overcome new communication types and increasing sophistication of criminals. This functionality enables the updating databases which are accessible and updatable by all three bots.

The present invention employs natural language with actual or apparent identity criminals and induce them to take certain steps in trade for actual ill-gotten, bogus or poison data provided by the invention. Natural language bots in general are utilized for searching and transacting and are more particularly useful in the instant invention specifically in the knowledge-domain of identity crimes.

Automated means for informing or requesting the assistance of law enforcement using networks (e.g. the Internet) are the subject of some intellectual pursuits, and a major initiative in the United States known as "E-911" and other programs designed to create a unified system of digital law enforcement notifications (including required federal mandated access to emergency dispatch systems under the Americans with Disabilities Act. The art taught herein can create such notifications in the course of or in response to, an identity crime through the third bot.

In an exemplary embodiment of the present invention, the system comprising the three bots is self-instantiating and/or multi-threaded program-based searching. During the course of such self-instantiating and/or multi-threaded searches and as earlier noted, the system updates its own memory (such as a database) with found keywords, responses, locations, patterns, terminology, conversational timing emulation, and criminal phraseology and pattern analyses.

The details of one or more examples related to the invention are set forth in the accompanying drawings and the description below. Other features, objects, and advantages of the invention will be apparent from the description and drawings, and from any appended claims.

DETAILED DESCRIPTION OF PREFERRED EMBODIMENTS OF THE INVENTION

Figure 1:
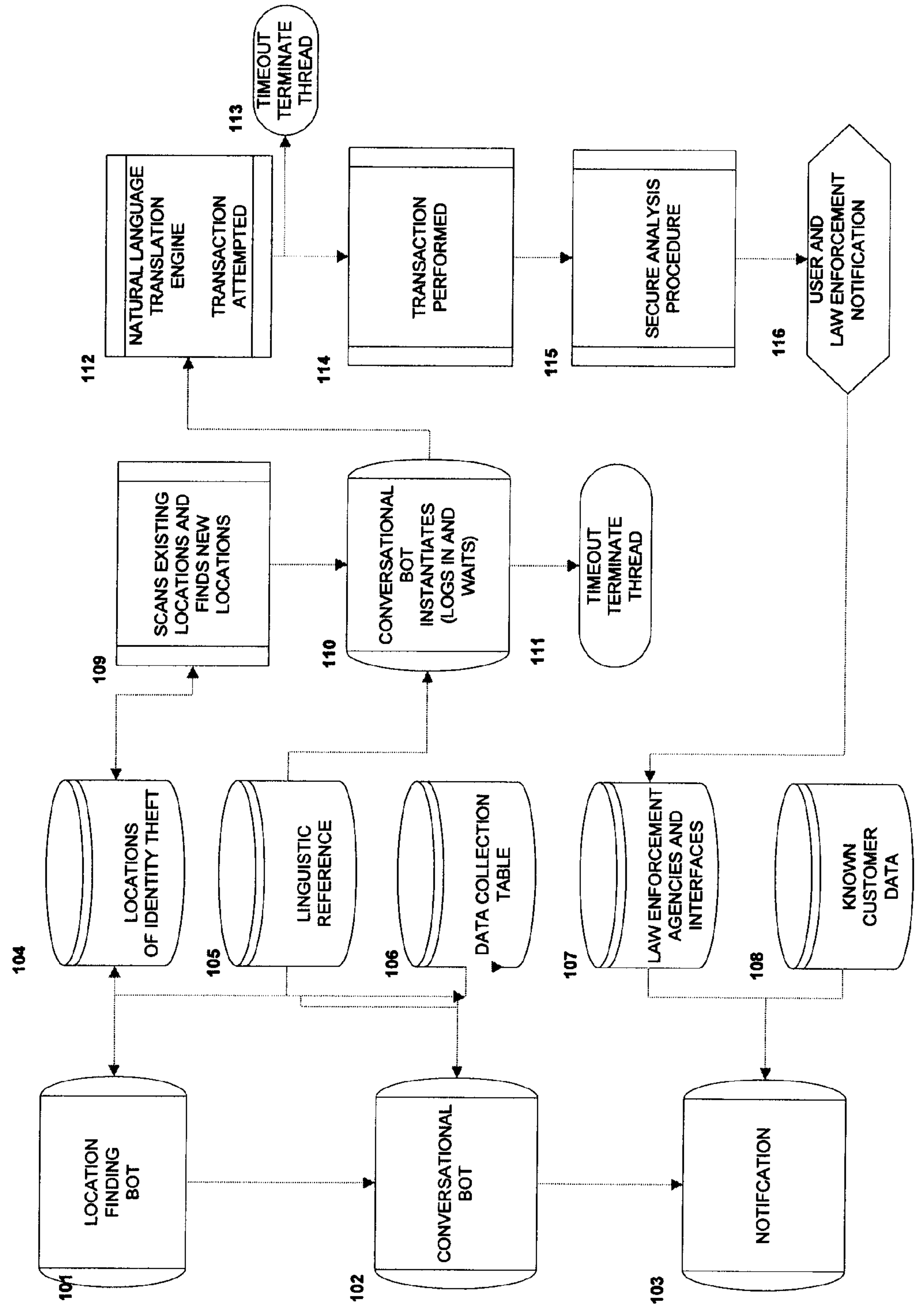
FIG. 1 is a flow diagram summarizing overall operation of the invention

The present invention is a system and related methods for the prevention of identity theft. Referring to FIG. 1, a multi-threaded location finding search engine bot 101 initiates searching for the locations of computer-based identity theft elements through module 104. This search is initiated through one or a plurality of natural language conversations programmed to operate through conversation bot 102. A notification bot 103 of the system is programmed to provide notice of possible or actual identity theft to an integrated notification system (such as the system described in the '252 application incorporated herein by reference) or directly to one or more law enforcement agency computer systems 107 in the automated manner required by said law enforcement agencies 107. The combination of these three primary bots or modules results in a computer-based system, which operates and provides locations of identity theft and possible datasets to attached functions (i.e., individual users exchanging signal exchanges via personal computers, handheld computing devices, cell phones, or the like) according to policies assigned to the attached functions. During the course of these searches, the invention updates its own linguistic reference memory 105 with found keywords, responses, locations, patterns, terminology, conversational timing emulation, and criminal phraseology and pattern analyses through bot 104. Actual sent and/or received data is stored at data collection memory 106 distinct from linguistic reference memory 105. It is to be noted that these and the other memories to be described herein are databases, which may be embodied in a single memory device, separate memory sections, located on a single computing device or located on multiple computing devices networked together.

The search engine bot 101 scans and writes to data collection memory 106, the law enforcement agency computer system 107 or both, existing or newly uncovered locations where personal data are being traded. The conversation bot 102 is instantiated at the locations of criminal information trade represented as block 109.

The search engine bot 101 finds, updates and compares known locations on networks (e.g. the Internet in the form of IRC chatting and of web sites where illegal personal identity information is collected, transmitted or remains (e.g. sites directed from "phishing" e-mails), and online chat rooms where transactions for the purchase and sale of illegally obtained or used private identity information. This information includes, but is not limited to, personal information such as name and address and a federal tax identification number (such as the Social Security Number in the U.S., or national identification numbers elsewhere,) location information, previous criminal or civil litigation information, incarceration information, property ownership records, employment information, medical records or insurance information, credit information including credit card numbers, expiration dates and/or CVV credit card security codes represented individually or in any combination as information. The search engine bot 101 further records new venues, terminology and text parsing techniques to overcome new communication types and increasing sophistication of criminals updating databases which are accessible and updatable by the search engine bot 101, the conversation bot 102 and the notification module 103.

After instantiation, the search engine bot 101 and the conversation bot 102 wait for interaction at operational step 110 in one or a plurality of locations 109. If after a pre-determined amount of time, when no interaction is solicited or received, the program terminates at operational step 111 and re-instantiates in other locations through bot 104. When interaction is solicited or received, the system responds in natural language through conversation bot 102 and attempts to solicit a transaction of stolen financial or other personal information. That information is analyzed and compared to known user information maintained in updatable memory 108. When data in the information received is analyzed it is compared to known user information of memory 108.

The present invention is able to simulate human text conversation through conversation bot 102, and enables automated language interaction with a one or a plurality of identity criminals. This natural language is of an "artificial intelligence" nature which is knowledge domain specific to identity crimes and dynamically updates its own database with found facts and terminology which relate to the commission of on-line or computer network-based crimes.

Figure 2:
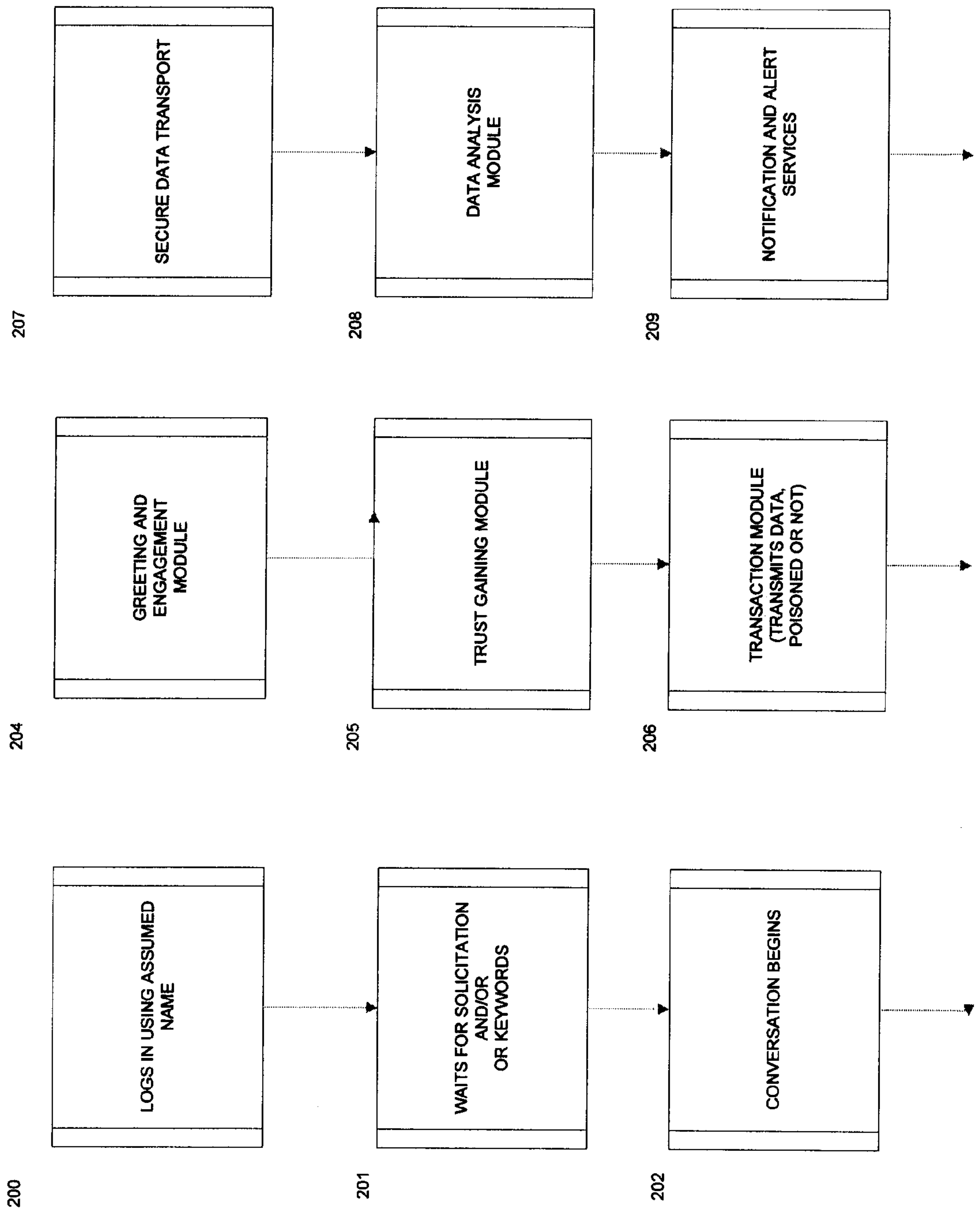
FIG. 2 is a flow diagram detailing the natural language techniques to induce a transfer of possibly stolen data.

As illustrated by the steps of the method of the present invention represented in FIG. 2, natural language techniques are employed through conversation bot 102 to induce a transfer of possibly stolen data with nefarious computer-based systems represented by locations of block 109 as follows. First, the instantiation begins by logging in to an identified location using an assumed name (step 200). Assumed names are stored and "seasoned" so as to be familiar to the identity criminal(s) in a given location by use, posting of false. The system of the present invention then "waits" for solicitation (step 201). When conversation begins (step 202), the conversation bot 102 uses memories of previous successful and unsuccessful attempts to initiate a signal exchange as a natural conversation represented through an engagement module (step 204).

Natural language conversation is accomplished once solicited by one or a plurality of possible illegal data traders contemporaneously, or if the system receives a response to a like solicitation generated by the greeting, engagement (step 204) and trust building routines (step 205) are used to create human-like text conversations, or react to conversational patterns, as stored and persistently updated retained at linguistic reference memory 105. The system continues to attempt a transaction as the conversation continues (step 206). Regardless of its success, information regarding the system's attempts is recorded to make the system more accurate in future attempts via updating of bot 104.

The present invention attempts to commence conversations premised on a criminal transaction of identity data and persistently referring to and updating a dynamic dataset of criminal terms of art and conversational types, including those intended by a perpetrator to detect if the present invention is in fact a human or computer program. The system records the text of the conversation for future analyses and incorporation into its datasets. All user input must be parsed to remove characters used to obscure the handle or name of the possible data thief as well as for linguistic analysis. The program removes all punctuation from inputs and checks for duplicate inputs. In order to create a conversation that is realistic to the human identity thief, some synonyms are derived from the linguistic reference memory 105. Pronouns must also be altered to create realistic conversation. A keywords database portion of the linguistic reference memory 105 is then used to determine what kind of transaction type is expected, and certain types of explicit means for explicit circumstances. When a keyword is found, the user input preceding the keyword is extracted; transformations are performed on the extracted output and transferred in to a response. When the invention cannot derive an appropriate response, a non-committal or diffusive response is returned. The response is then transmitted via the network means applicable, and the conversation continues until a transaction, such as the sale or trade of bogus, or poisoned personal information or credit card numbers (step 207). When the invention transmits data in trade, it is bogus data, such as the "test cases" used by credit bureaus for use by developer's integration with their systems.

In an exemplary law enforcement or financial security embodiment of the present invention, the data used for trade can be "poisoned" for use such as in a law enforcement "sting" operation where the numbers dispensed are poisoned for monitoring and physical manifestations of the identity thief. The module then transfers information to any or all of the following: an integrated identity theft system (as in the referenced '252 application), a financial notification system, an integrated interface to a Global Positioning System wherein actual locations of identity theft are transmitted directly to local or regional law enforcement dispatch systems, pre-determined representatives of the user, credit bureaus or any other party as defined by the user, or optionally to no other entity at all.

When a natural language introduction is successful, a transaction module shown in FIG. 1 as modules 112 and 114 associated with the search engine bot 101 then instantiates at step 206. This transaction module receives and/or trades information in exchange for a dataset. That dataset may be compared solely against information regarding a user whereupon notification is made either directly to a user, a law enforcement agency or a combination of all of the above (e.g. a dataset such as stored and updated in the referenced '252 application) (steps 208 and 209).

Any data received through the transaction is transported securely (step 207) and then analyzed against one or a plurality of data sets (step 208) through module 115 associated with the search engine bot 101—including but not limited to known user data, known stolen data tables or numerical ranges of accounts.

The results of the analysis of step 207 and related rule sets will dictate which accounts are likely indicia of identity theft and what, and to whom, it will be reported (step 209) using module 116 associated with the search engine bot 101.

The invention further includes means for transmitting text strings into keyed arrays so that the invention does not inadvertently betray any known personal information of its users. For example, the invention may be seeking indicia of the social security number of one of its users (e.g. 555-50-5555) and the database which contains known user data indicates the user with that social security number currently resides in New York. A string would be formed based on predictive analysis of the present system and/or by production of a random integer residing in one of the invention's secure databases, a string is formed which is likely to produce matched results but not reasonable for a human or computer to reconstitute, or to do so in a timely fashion, into its source information.

The following disclosure of the encryption scheme of the present invention, is without limitation as to future well-known cryptographic advances in which an artisan may improve or replace with a host of well-known encryption schemes and/or products. Basically, the text data to be encrypted into byte afrays against certain random values generated by the invention. A definitively 'cryptographically secure' random number is not required for this simple "on the fly" translation of search criteria and its collection mechanism, just one that is unique. The program pads the search data with between 1 and 16 bytes to make the length an exact multiple of the block size (16-bytes). The value of all the padding bytes are the same as the number of padding bytes added. Note that padding is always added to make it unambiguous. The module 112 includes functionality to perform the further steps of generation of a 16-byte pseudo-random bit key. The invention uses this bit key (or part of it) in the key derivation function. Further, it encrypts the padded plaintext data which, over a secure network or a plurality of secure networks, using the bit key generated above. The cipher code forming a part of module 112 examines text bytes and encodes all of the above using base64 encoding. This is the text that will be transmitted to derive information available about a user or subject without betrayal of any personal information en route.

Additionally, the processes, steps thereof and various examples and variations of these processes and steps, individually or in combination, may be implemented as a computer program product tangibly as computer-readable signals on a computer-readable medium, for example, a non-volatile recording medium, an integrated circuit memory element, or a combination thereof. Such computer program product may include computer-readable signals tangibly embodied on the computer-readable medium, where such signals define instructions, for example, as part of one or more programs that, as a result of being executed by a computer, instruct the computer to perform one or more processes or acts described herein, and/or various examples, variations and combinations thereof. Such instructions may be written in any of a plurality of programming languages, for example, Java, Visual Basic, C, or C++, Fortran, Pascal, Eiffel, Basic, COBOL, and the like, or any of a variety of combinations thereof. The computer-readable medium on which such instructions are stored may reside on one or more of the components of the system's bots and/or associated modules described above and may be distributed across one or more such components. The bots and modules are embodied in either or both of hardware and software.

Although the present invention is particularly well suited for use with the English language and is so described; it is equally well suited for use with other natural languages. Wherein natural languages are those languages that can be spoken, read, and written by individuals.

A number of examples to help illustrate the invention have been described. Nevertheless, it will be understood that various modifications may be made without departing from the spirit and scope of the invention. Accordingly, other embodiments are within the scope of the claims appended hereto.

What is claimed is:

1. A system to locate and deny theft of personal information in a computer network, the system comprising:

a. a search engine bot arranged to scan and write to memory existing or newly uncovered locations where personal data are being traded in the computer network;

b. a conversation bot interactive with the search engine bot and arranged to solicit a transaction of stolen personal information through a natural language human conversation enticement;

c. a notification bot interactive with the search engine bot to provide notification of the existence of a stolen personal information provider discovered through the conversation bot; and d. a computer, wherein one or more of the search engine bot, the conversation bot and the notification bot are embodied in one or more computer programs stored in a computer readable medium and are executed by the computer, wherein the search engine bot is further configured to update the memory with found keywords, responses, locations, patterns, terminology, conversational timing emulation, and criminal phraseology and pattern analyses.

2. The system as claimed in claim 1 wherein the search engine bot is a self-instantiating or multi-threaded spider bot.

3. The system as claimed in claim 1 further comprising a module for locating one or more computer-based locations where the personal information may be acquired.

4. The system as claimed in claim 1 wherein the conversation bot further includes means for conducting a transaction with the location engaged in the trade of personal information involving the sale or trade of bogus or poisoned personal or credit card information.

5. A system to locate and deny theft of personal information in a computer network the system comprising:

a. a search engine bot arranged to scan and write to memory existing or newly uncovered locations where personal data are being traded in the computer network;

b. a conversation bot interactive with the search engine bot and arranged to solicit a transaction of stolen personal information through a natural language human conversation enticement;

c. a notification bot interactive with the search engine bot to provide notification of the existence of a stolen personal information provider discovered through the conversation bot; and d. a computer, wherein one or more of the search engine bot, the conversation bot and the notification bot are embodied in one or more computer programs stored in a computer readable medium and are executed by the computer, wherein the search engine bot is further configured to find, update and compare known locations on interconnected networks where illegal personal identity information is collected, transmitted or remains, and online chat rooms where transactions for the purchase and sale of illegally obtained or used private identity information is collected, transmitted or remains.

6. The system as claimed in claim 5 further comprising means for recording new venues, terminology and text parsing techniques to overcome new communication types and increasing sophistication of personal information gathering mechanisms.

7. A system to locate and deny theft of personal information in a computer network, the system comprising:

a. a search engine bot arranged to scan and write to memory existing or newly uncovered locations where personal data are being traded in the computer network;

b. a conversation bot interactive with the search engine bot and arranged to solicit a transaction of stolen personal information through a natural language human conversation enticement;

c. a notification bot interactive with the search engine bot to provide notification of the existence of a stolen personal information provider discovered through the conversation bot;

d. means to commence a conversation premised on a criminal transaction of identity data and persistently referring to and updating a dynamic dataset of criminal terms of art and conversational types, including those intended by a perpetrator to detect if the search engine bot is a human or computer program; and e. a computer, wherein one or more of the search engine bot, the conversation bot, the notification bot and the means to commence a conversation are embodied in one or more computer programs stored in a computer readable medium and are executed by the computer.

8. The system as claimed in claim 7 further comprising means to record the text of the conversation for future analyses and incorporation into datasets of the memory.

9. The system as claimed in claim 8 further comprising means to parse user input to remove characters used to obscure the handle or name of the possible data thief as well as for linguistic analysis including removing all punctuation from inputs and checking for duplicate inputs.

10. The system as claimed in claim 9 further comprising means to create a conversation that is realistic to the human identity thief including one or more synonyms derived from a synonym table.

11. The system as claimed in claim 10 further comprising means to alter pronouns to create realistic conversation.

12. The system as claimed in claim 11 further comprising means to determine what kind of transaction type is expected, and certain types of explicit means for explicit circumstances, based on keywords observed.

13. The system as claimed in claim 12 further comprising means to extract user input information preceding the keyword when the keyword is found and performing transformations on the extracted output and transferred in to a response.

14. The system as claimed in claim 13 further comprising means for returning a non-committal or diffusive response when an appropriate response cannot be derived.

15. A system to locate and deny theft of personal information in a computer network, the system comprising:

a. a search engine bot arranged to scan and write to memory existing or newly uncovered locations where personal data are being traded in the computer network;

b. a conversation bot interactive with the search engine bot and arranged to solicit a transaction of stolen personal information through a natural language human conversation enticement;

c. a notification bot interactive with the search engine bot to provide notification of the existence of a stolen personal information provider discovered through the conversation bot; and d. a computer, wherein one or more of the search engine bot, the conversation bot and the notification bot are embodied in one or more computer programs stored in a computer readable medium and are executed by the computer, wherein the notification bot further includes means for informing or requesting electronically the assistance of one or more law enforcement agencies using networks, whether through a private notification system or a common public notification system.

16. The system as claimed in claim 15 wherein the means for informing or requesting further includes one or more filters applied to generate, using preexisting forms of the one or more law enforcement agencies, automated notifications as though the user were typing data directly into such forms by screen scraping and automated keystrokes.

* * * * *